(12) United States Patent
Sedaghat Amoli et al.

(10) Patent No.: US 11,781,722 B2
(45) Date of Patent: Oct. 10, 2023

(54) COVER UNIT AND LIGHTING MOUNTING FOR VEHICLE

(71) Applicant: Volvo Car Corporation, Gothenburg (SE)

(72) Inventors: Alborz Sedaghat Amoli, Gothenburg (SE); Oskar Blank, Gothenburg (SE); Thomas Lippert, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/942,427

(22) Filed: Sep. 12, 2022

(65) Prior Publication Data
US 2023/0109766 A1   Apr. 13, 2023

(30) Foreign Application Priority Data

Oct. 13, 2021   (EP) .................................... 21202331

(51) Int. Cl.
*B60Q 1/05* (2006.01)
*F21S 41/43* (2018.01)
*F21S 41/47* (2018.01)

(52) U.S. Cl.
CPC ................ *F21S 41/43* (2018.01); *B60Q 1/05* (2013.01); *F21S 41/47* (2018.01)

(58) Field of Classification Search
CPC .... B60Q 1/0041; B60Q 2400/30; B60Q 1/14; B60Q 1/05; B60Q 1/2692; F21S 43/14;
(Continued)

(56) References Cited

U.S. PATENT DOCUMENTS 3,387,125 A   6/1968   Ingolia
4,516,191 A   5/1985   Moriyama et al.
(Continued)

FOREIGN PATENT DOCUMENTS

DE   102020104677 A1 *   8/2021
JP   S59192632 A         11/1984
JP   S61175135 A         8/1986

OTHER PUBLICATIONS

Search English translation of DE 102020104677 A1 (Year: 2021).*
Mar. 15, 2022 European Search Report issued in corresponding International Application No. 21202331.1.

*Primary Examiner* — Omar Rojas Cadima
(74) *Attorney, Agent, or Firm* — Clements Bernard Walker; Christopher L. Bernard

(57) ABSTRACT

A cover unit for selectively covering an opening in a structure, including: at least a first cover element having a first axial end coupled to a first driving mechanism, and a second axial end coupled to a second driving mechanism; the first driving mechanism and the second driving mechanism configured to move the first cover element between a closed position and an opened position; each including: an arm configured to be rotatively coupled to the structure, at least one drive unit configured to drive a movement of the arm, and a joint configured to couple the arm to the axial end of the first cover element, the joint configured to allow a two-axis rotation and one linear axis movement, wherein the joint is configured to allow the first axial end and the second axial end of the first cover element to be moved differently during an opening movement and/or a closing movement.

12 Claims, 6 Drawing Sheets

(58) Field of Classification Search
CPC ........ F21S 43/245; F21S 43/249; F21S 45/10;
F21S 41/40; F21S 41/635; F21S 41/683;
F21S 41/686; F21S 41/689; F21S 41/695;
F21W 2103/55; B60J 7/146; B60J 7/148;
F21V 11/18
See application file for complete search history.

(56) References Cited

U.S. PATENT DOCUMENTS

| | | |
|---|---|---|
| 4,602,319 A | 7/1986 | Moriyama et al. |
| 2002/0081965 A1 | 6/2002 | Demerath et al. |
| 2020/0173622 A1* | 6/2020 | Fritzon .................... B60Q 1/14 |

* cited by examiner

# COVER UNIT AND LIGHTING MOUNTING FOR VEHICLE

CROSS-REFERENCE TO RELATED APPLICATION

The present disclosure claims the benefit of priority of co-pending European Patent Application No. 21 202 331.1, filed on Oct. 13, 2021, and entitled "COVER UNIT AND LIGHTING MOUNTING FOR VEHICLE," the contents of which are incorporated in full by reference herein.

TECHNICAL FIELD

The present disclosure relates to a cover unit for selectively covering or exposing an opening in a structure, and a lighting mounting for a vehicle.

BACKGROUND

Shutters or cover units for covering lights of a vehicle are well known. The cover units are configured to cover or reveal the light by performing a pivoting motion. There exist various types of cover units, e.g. cover units including one cover element or cover units including two cover elements. The one cover element usually performs an opening movement similar to an opening garage door. The two cover elements are arranged parallel to each other in a closed position and during the opening and/or closing movement. Usually, the two cover elements contact each other substantially half way, and are moving away from each other during the opening movement, and towards each other during the closing movement.

SUMMARY

There may, therefore, be a need to provide an improved cover unit for selectively covering or exposing an opening in a structure, particularly in a structure of a vehicle body, and a lighting mounting for a vehicle, particularly a cover unit and/or a lighting mounting for a vehicle requiring a reduced installation space and/or providing an increased adaptability to a given installation space.

According to a first aspect, there is provided a cover unit for selectively covering or exposing an opening in a structure. The cover unit includes at least a first cover element for covering or exposing the opening at least partly, wherein the first cover element has a first axial end being coupled to a first driving mechanism, and a second axial end being coupled to a second driving mechanism. The first driving mechanism and the second driving mechanism are configured to move the first cover element between a closed position and an opened position. Each of the first driving mechanism and the second driving mechanism is controlled individually, and includes an arm being configured to be rotatively coupled to the structure, at least one drive unit being configured to drive a movement of the arm, and a joint being configured to couple the arm to the respective axial end of the first cover element, and being configured to allow a two-axis rotation and one linear axis movement. Further, the joint is configured to allow the first axial end and the second axial end of the first cover element being moved differently during an opening movement for exposing the opening and/or a closing movement for covering the opening.

Allowing the first axial end and the second axial end of the first cover element to be moved differently means that the first axial end and the second axial end may be moved different distances. This may allow more freedom to move and/or an increased range of motion. Thereby, a plurality of shapes can be covered or exposed by the cover unit, such as a rectangular shape, but also such as a triangular shape, a tapered shape and/or a trapezoidal shape. This may provide the adaptability to match various different shapes of openings, particularly modern design openings. The joint of each of the first driving mechanism and the second driving mechanism may allow compensating for a length difference between the first axial end and the second axial end, when they are moved different distances. Further, each of the first driving mechanism and the second driving mechanism may allow a linear movement as well as a rotating movement of the respective axial end, and thus, of the first cover element, during the opening and/or closing movement. This allows achieving a reduced required space for the opening and/or closing movement of the first cover element. In particular, the cover unit allows adapting to a contour of the opening, which results in a reduced required installation space. Further, the cover unit allows following an exterior contour of the opening in a closed as well as in an open position.

Further, the cover unit may additionally include a second cover element, which has a first axial end being coupled to a third driving mechanism, and a second axial end being coupled to a fourth driving mechanism. The third driving mechanism and the fourth driving mechanism may be configured to move the second cover element between a closed position and an opened position. Each of the third driving mechanism and the fourth driving mechanism may be controlled individually, and may include an arm being configured to be rotatively coupled to the structure, at least one drive unit being configured to drive a movement of the arm, and a joint being configured to couple the arm to the respective axial end of the first cover element, and being configured to allow a two-axis rotation and one linear axis movement. Further, the joint may be configured to allow the first axial end and the second axial end of the first cover element being moved differently during an opening movement for exposing the opening and/or a closing movement for covering the opening. The first cover element and the second cover element may be configured to contact each other in the closed position along a contact line to cover the opening, and/or the first cover element and the second cover element may be configured to be spaced apart from each other in the opened position to expose the opening.

Additionally providing a second cover element may allow covering or exposing larger openings without requiring an increased space for the opening and/or closing movement. Further, the combination of the first cover element and the second cover element may increase the amount of coverable shapes the opening may have. In particular, the cover unit may increase the degree of its adaptability to a contour of the opening, which results in a reduced required installation space.

During the opening movement, the first axial end of the first cover element may be moved a shorter distance by the first driving mechanism that the second axial end of the first cover element by the second driving mechanism.

Thus, the first cover element may perform an angled movement. The angled movement may enable the first cover element to follow an exterior design of the vehicle and/or to follow an inside cavity of the available installation space. In other words, controlling the first driving mechanism independent from the second driving mechanism, may allow using the available installation space by providing the adaptability of the first cover element's movement.`

Furthermore, during the opening movement, the first axial end of the second cover element is moved a short distance by the third driving mechanism than the second axial end of the second cover element by the fourth driving mechanism.

Thus, the second cover element may perform an angled movement. The angled movement may enable the second cover element to follow an exterior design of the vehicle and/or to follow an inside cavity of the available installation space. In other words, controlling the third driving mechanism independent from the fourth driving mechanism, may allow using the available installation space by providing the adaptability of the first cover element's movement.

According to an embodiment, each of the first driving mechanism and the second driving mechanism may be configured to move the first cover element in at least two different spatial directions, namely an opening direction and a retracting direction.

Thus, each of the first driving mechanism and the second driving mechanism may allow a retraction movement in addition to the angled movement during the opening movement, thereby further reducing the required installation space for the cover unit.

Additionally, or alternatively, each of the third driving mechanism and the fourth driving mechanism may be configured to move the second cover element in at least two different spatial directions, namely an opening direction and a retracting direction.

Thus, each of the third driving mechanism and the fourth driving mechanism may allow a retraction movement in addition to the angled movement during the opening movement, thereby further reducing the required installation space for the cover unit.

According to a second aspect, the cover unit of the first aspect is used for covering and/or exposing an opening for a lighting of a vehicle.

Using the cover unit for covering and/or exposing a lighting of a vehicle may provide an increased adaptability to match, particularly modern designed, lighting of a vehicle. In particular, the cover unit may allow adapting to a contour of a lighting, such as a headlight, a taillight etc., which results in a reduced required installation space. Further, the cover unit may allow following an exterior contour of the vehicle in a closed as well as in an open position.

According to a third aspect, there is provided a lighting mounting for a vehicle. The lighting mounting includes a mounting body having an opening, a lighting unit including at least one light source, which is configured to be exposable in the opening of a body, and a cover unit of the first aspect, which is configured to close or open the opening for covering or revealing the at least one light source.

Using the cover unit for covering and/or exposing a lighting of a vehicle may provide an increased adaptability to match, particularly modern designed, lighting of a vehicle. In particular, the cover unit may allow adapting to a contour of a lighting, such as a headlight, a taillight etc., which results in a reduced required installation space. Further, the cover unit may allow following an exterior contour of the vehicle in a closed as well as in an open position.

According to an embodiment, the opening may have a substantially non-rectangular shape. For example, the opening may have a tapering contour, wherein a base of the tapering contour may correspond to an outer, substantially vertical, edge of the opening when seen in the axial direction. Alternatively, the opening may have various other contours, such as a triangular contour etc. A non-rectangular but edgy contour may provide an appealing and modern design.

Further, the opening may be configured to fit to an opening in a body of the vehicle. This may allow increasing the utilization of the available installation space.

Furthermore, the lighting mounting may include a driving unit configured to move the lighting unit towards the opening and/or to retract the lighting unit from the opening.

The driving unit may be configured to retract the lighting unit during a closing movement of the cover elements and/or to move the lighting unit towards the opening during an opening movement of the cover elements.

The driving unit may move the lighting unit towards the opening while the covering unit may perform the opening movement and/or the driving unit may retract the lighting unit from the opening while the covering unit may perform the closing movement. Thereby, the installation space of the lighting mounting may be reduced, as the lighting unit and the cover unit may be moved such that an installation space required by the cover unit in the closed position may be accommodate the lighting unit in the opened position and vice versa. This may improve the utilization of the available installation space.

Further, this may allow following an external contour of the vehicle. In other words, it may allow arranging the closed cover unit in the same plane in which the at least one light source is arranged, when the cover unit is in the opened position.

According to an embodiment, the lighting unit may further include several light sources.

Such a lighting unit may unite several different light-types needed in the vehicle, e.g. headlights for daytime running light, dimmed light, high beam light etc.

Furthermore, the several light sources may be configured to spread out fan-like during while moving towards the opening.

This means, in the retraced position, the light sources may be arranged close to each other, thereby reducing the required installation space for storing the light sources. In the extracted position, the light sources may be spread out in a, particularly horizontal, axial direction, for filling out the opening provided in the body of the vehicle. In other words, an axial installation space for accommodating the light sources in the retracted position may be smaller than a length of the opening in the axial direction.

It should be noted that the above embodiments may be combined with each other irrespective of the aspect involved. Accordingly, the cover unit may be combined with features described above with regard to the lighting mounting and, likewise, the lighting mounting may be combined with features described above with regard to the cover unit.

These and other aspects of the present disclosure will become apparent from and elucidated with reference to the embodiments described hereinafter.

BRIEF DESCRIPTION OF THE DRAWINGS

Exemplary embodiments of the disclosure will be described in the following with reference to the following drawings.

The figures are merely schematic representations and serve only to illustrate embodiments of the disclosure. Identical or equivalent elements are in principle provided with the same reference signs.

DESCRIPTION OF EMBODIMENTS

Figure 1A:
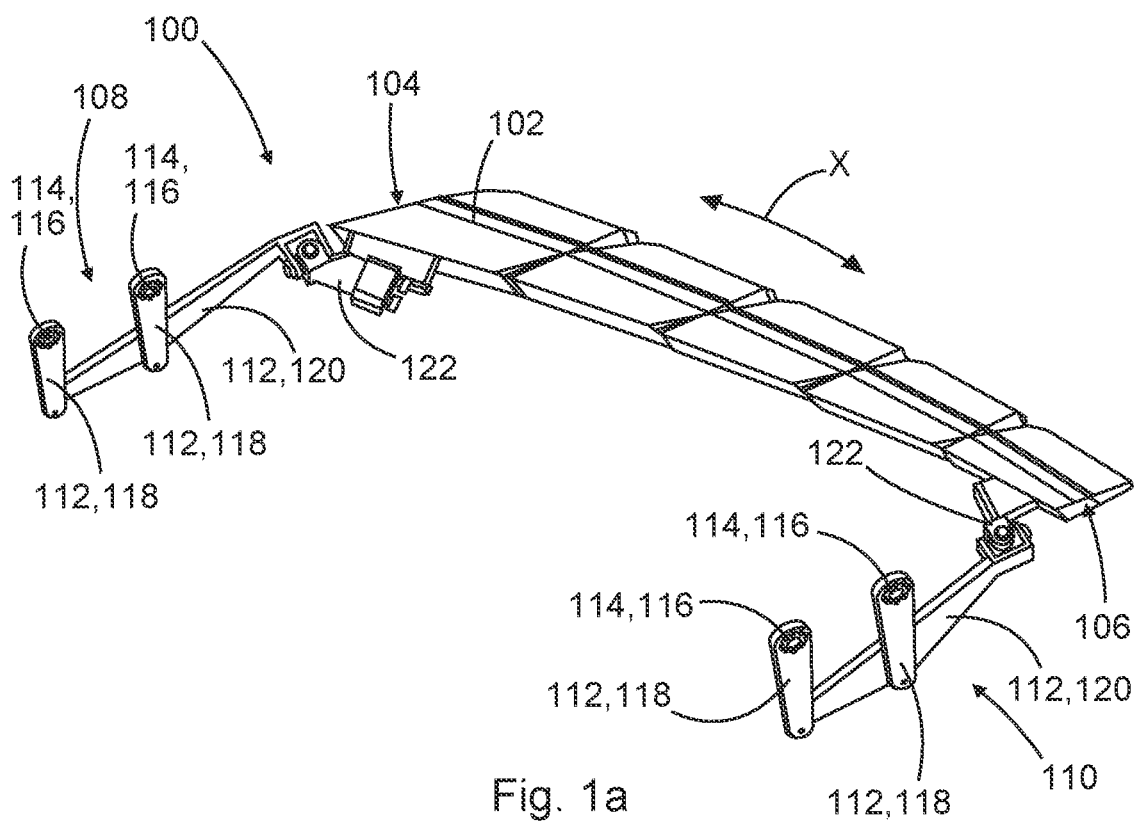
FIG. 1A shows a schematic perspective view of an exemplary embodiment of a cover unit in a first position.
Figure 1B:
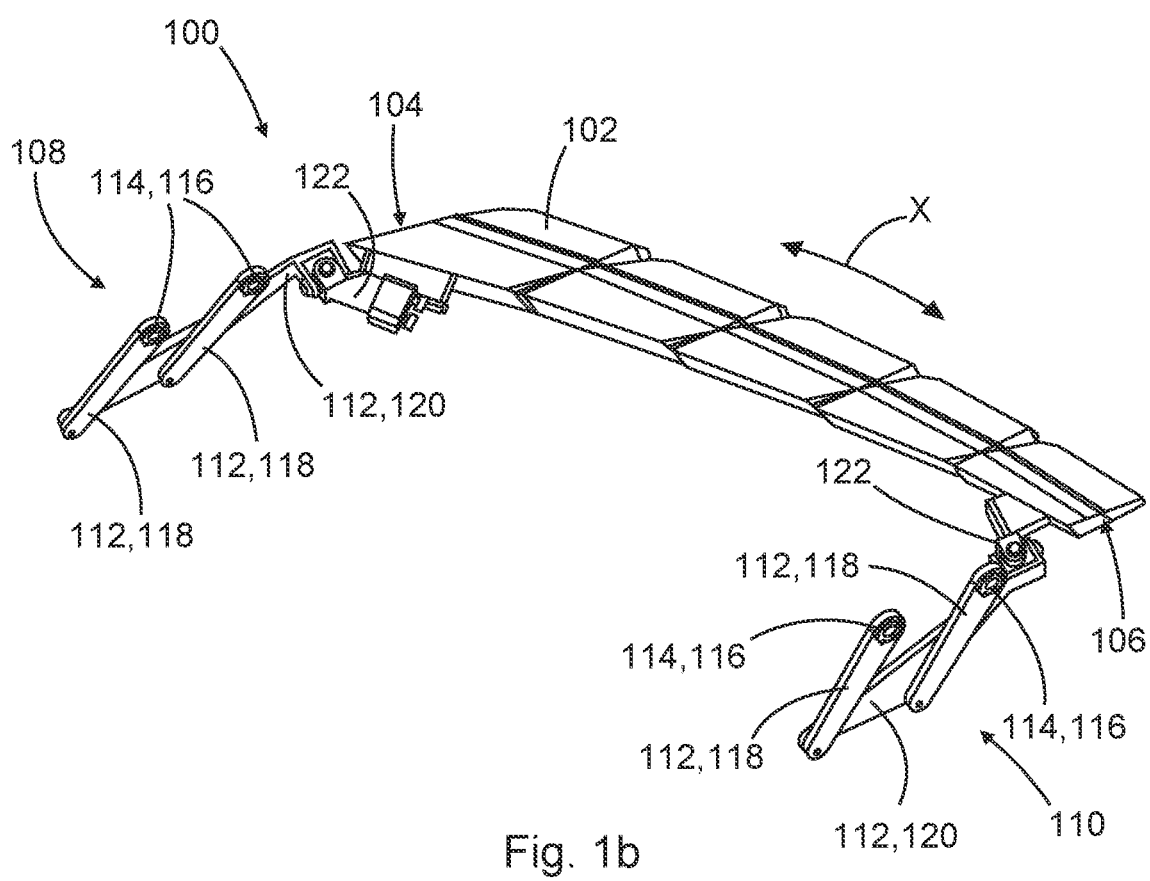
FIG. 1B shows a schematic perspective view of an exemplary embodiment of a cover unit in a second position.

FIGS. 1A and 1B show an exemplary embodiment of a cover unit 100 in a first position (FIG. 1A) and a second position (FIG. 1B), respectively. The cover unit 100 may be used for selectively covering or exposing an opening (not illustrated) in a structure, such as a vehicle body. The cover unit 100 includes a first cover element 102 having a first axial end 104 and a second axial end 106 when seen in an axial direction X.

The first axial end 104 is coupled to a first driving mechanism 108 and the second axial end 106 is coupled to a second driving mechanism 110. The first driving mechanism 108 and the second driving mechanism 110 are configured to move the first cover element 102 between a first position (FIG. 1A) and a second position (FIG. 1B). Further, the first driving mechanism 108 can be controlled and/or driven separately and independently from the second driving mechanism 110. Thus, the first axial end 104 can be moved separately from the second axial end 106.

Each of the first driving mechanism 108 and the second driving mechanism 110 includes an arm 112, which is rotatively connectable to the structure (not illustrated). In the FIGS. 1A and 1B, the arm 112 includes two connection points 114, which are configured to be fixed on the structure and each of the connections points 114 includes a ball bearing 116 allowing the arm 112 rotating relative to the structure. The arm 112 is an assembly of three arms, two support arms 118 and a guiding arm 120.

The two support arms 118 are arranged substantially parallel to each other and each of which includes one connection point 114 at one longitudinal end, and is rotatively connected to the guiding arm 120 at the opposite longitudinal end. Further, the support arms 118 may be connected to a drive unit (not illustrated) configured to drive a movement of the arm 112. The support arms 118 can be connected to the same drive, or can be each connected to a separate drive unit. The drive unit may be, for example, an electric motor.

The guiding arm 120 is connected to the first cover element 102 by a joint 122. The joint 122 is able to perform a two-axis rotation and one linear axis movement and will be explained in detail with regard to FIGS. 2A to 2C, thereby allowing that the first axial end 104 and the second axial end 106 can be moved different distances.

Figure 2A:
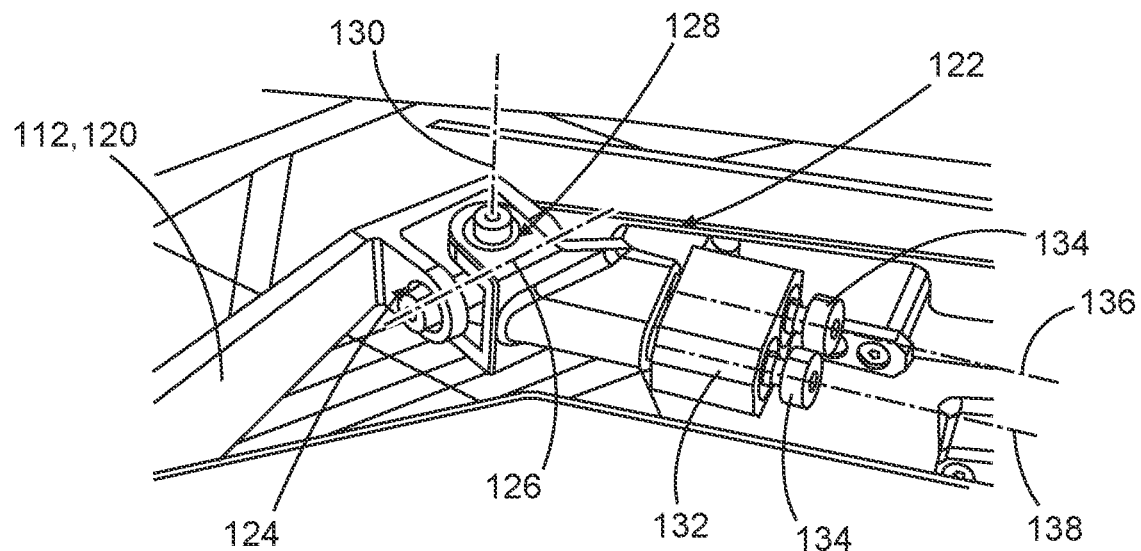
FIG. 2A shows a schematic view of an exemplary embodiment of a joint of a driving mechanism.
Figure 2B:
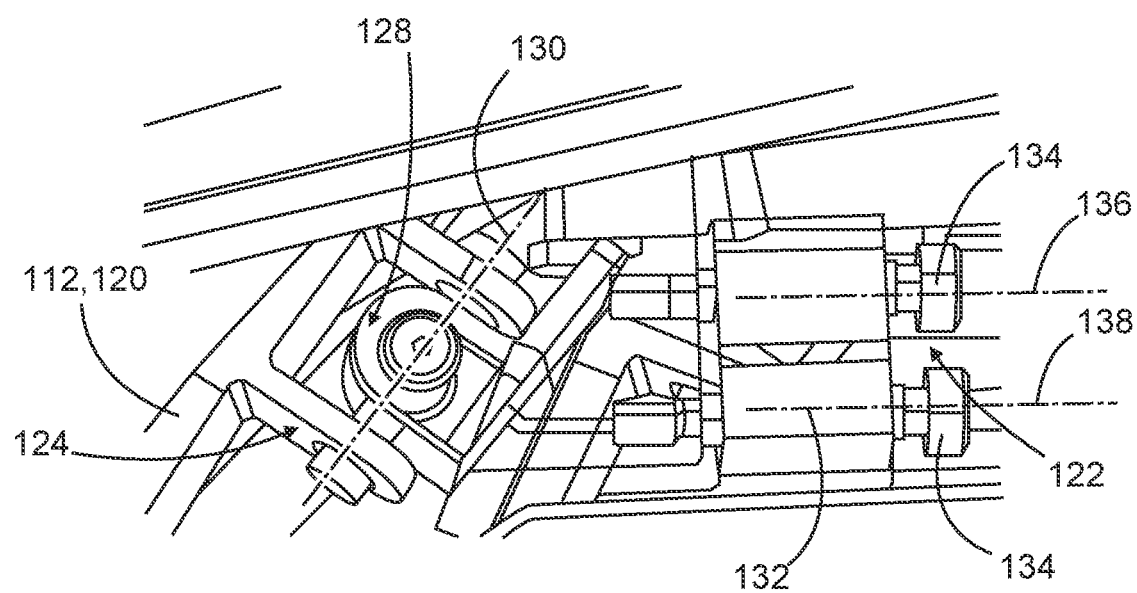
FIG. 2B shows another schematic view of the exemplary embodiment of the joint of the driving mechanism.
Figure 2C:
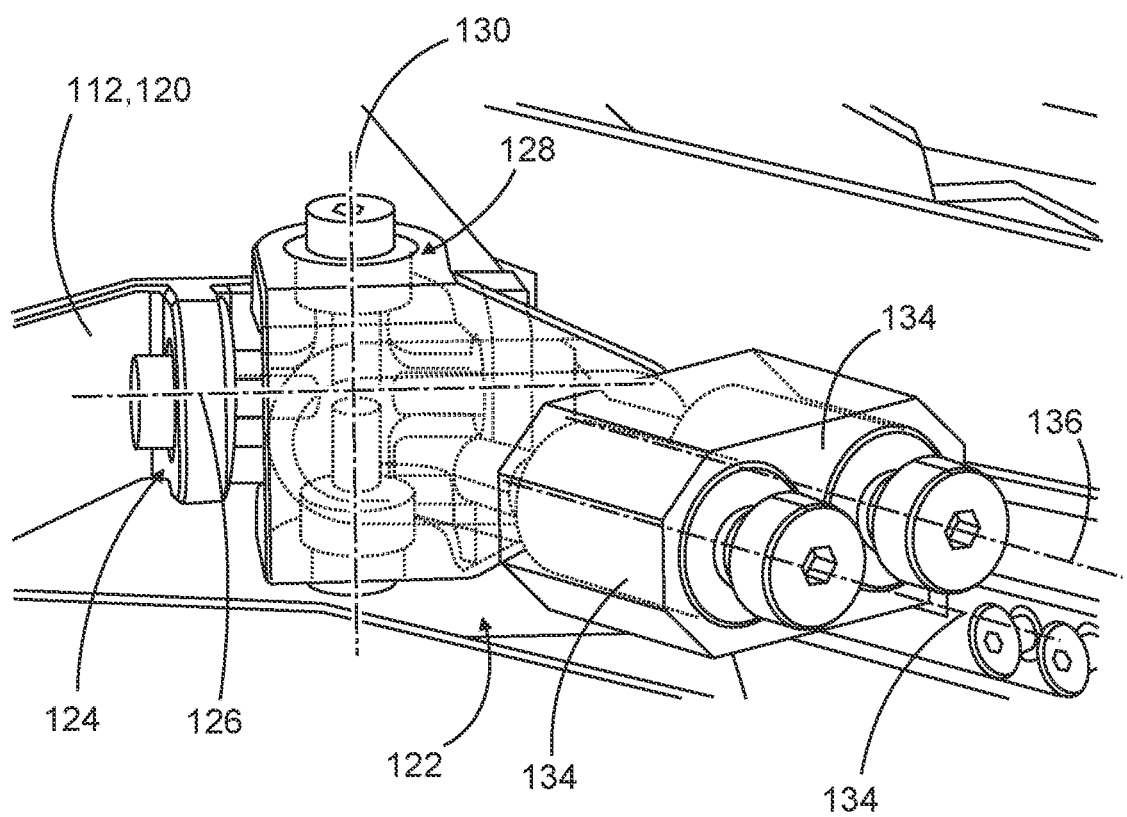
FIG. 2C shows a schematic top view of the exemplary embodiment of the joint of the driving mechanism.

The joint 122 is shown in more detail in FIGS. 2A to 2C. As mentioned above, the joint 122 is configured to allow a two-axis rotation and one linear axis movement. The two-axis rotation is enabled by combining two cylinder joints, wherein a first cylinder joint 124 allows the joint 122 rotating around a first axis 126, and a second cylinder joint 128 allows the joint 122 rotating around a second axis 130, being perpendicular to the first axis 126. The linear movement is enabled by a linear joint 132 including two cylinders 134, first of which being movable along an axis 136, second of which being moveable along an axis 138, wherein the axis 136 and the axis 138 are arranged substantially parallel to each other. The two cylinders 134 can be moved different distances. Thus, the joint 122 allows compensating for the length differences between the first axial end 104 and the second axial end 106 of the first cover element 102.

Figure 3A:
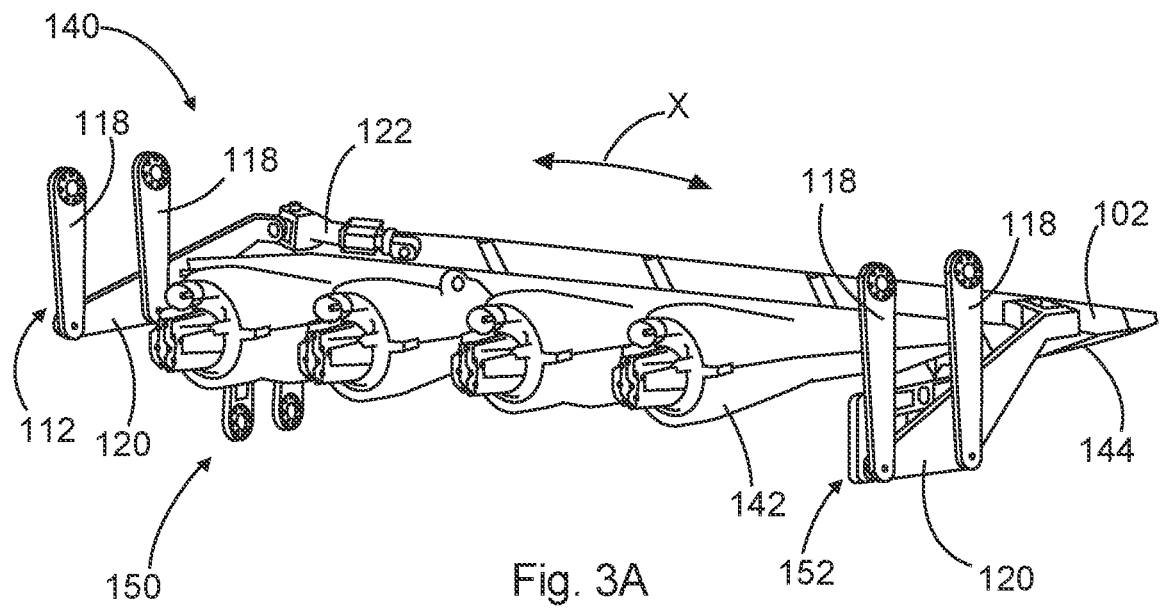
FIG. 3A shows a schematic perspective rear view of an exemplary embodiment of a lighting mounting in a closed position.
Figure 3B:
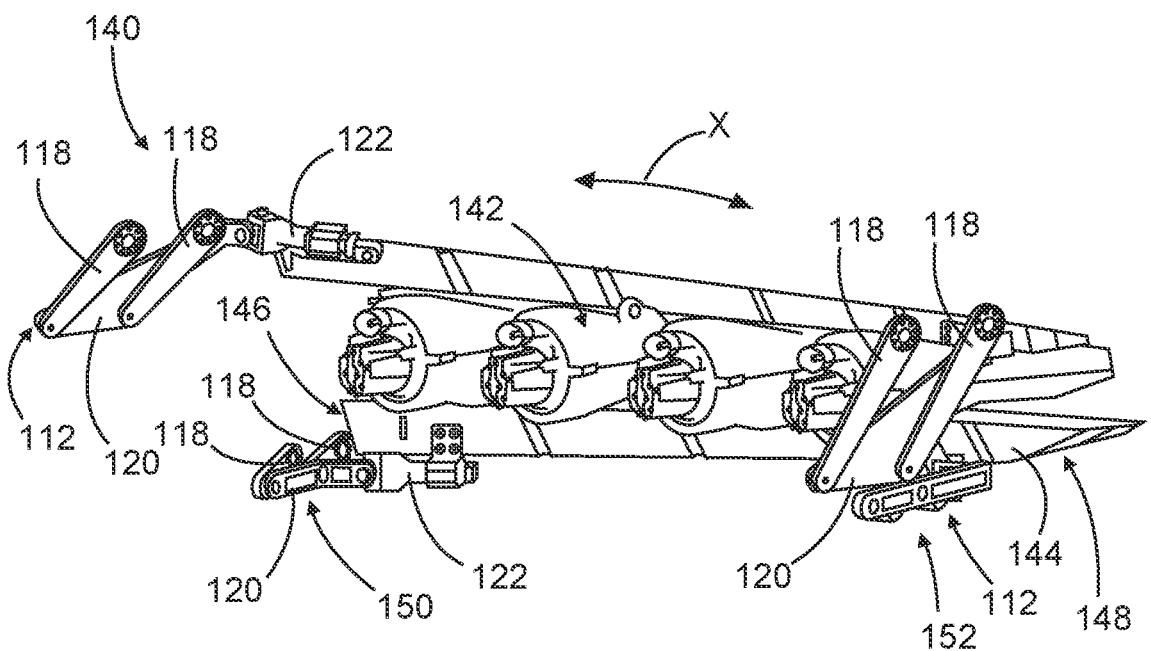
FIG. 3B shows a schematic perspective rear view of the exemplary embodiment of the lighting mounting in an opened position.
Figure 4A:
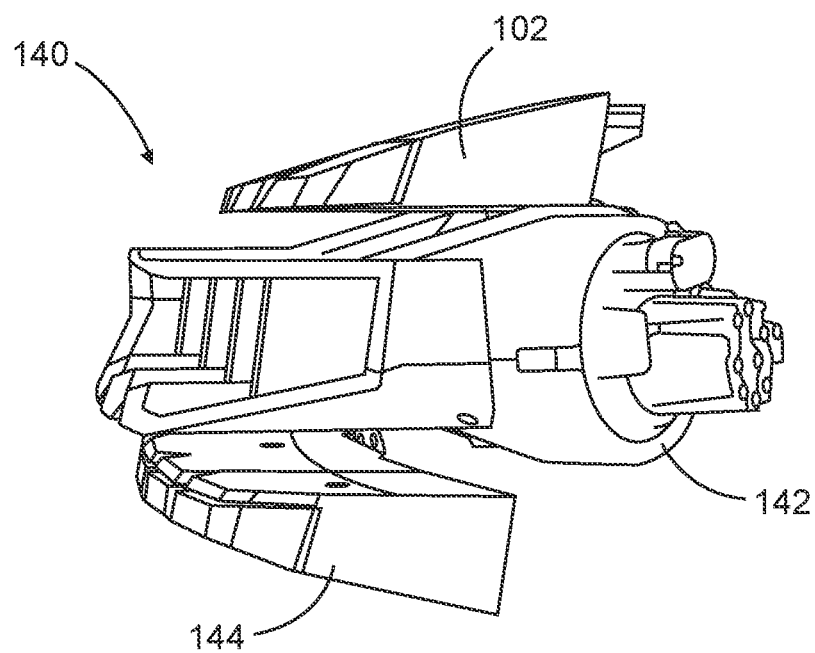
FIG. 4A shows a schematic side view of the embodiment of the lighting mounting in the closed position.
Figure 4B:
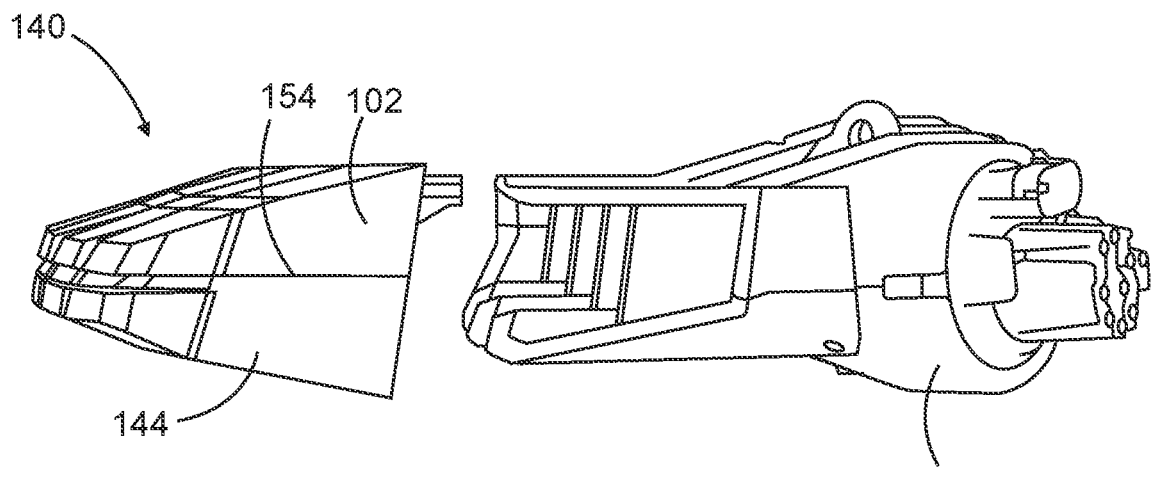
FIG. 4B shows a schematic side view of the embodiment of the lighting mounting in the opened position.

FIGS. 3A and 3B as well as FIGS. 4A and 4B partially show an exemplary embodiment of a lighting mounting 140 in a closed position (FIGS. 3A and 4A) and in an opened position (FIGS. 3B and 4B), wherein FIGS. 3A and 3B show a rear perspective view and FIGS. 4A and 4B show a side view.

The lighting mounting 140 includes a lighting unit 142, and the cover unit 100, wherein the cover unit 100 additionally includes a second cover element 144 having a first axial end 146 and a second axial end 148 when seen in the axial direction X. The first axial end 146 of the second cover element 144 is coupled to a third driving mechanism 150 and the second axial end 148 of the second cover element 144 is coupled to a fourth driving mechanism 152. The assembly and functioning of the second cover element 144 substantially corresponds to the assembly and functioning of the first cover element 102 and is therefore not explained in detail.

For covering the lighting unit 142, the cover unit 100 is in a closed position (see FIGS. 3A and 4A), wherein the first cover element 102 and the second cover element 144 contact each other forming a contact line 154 (see FIG. 4A). In the closed position of the cover unit 100, the lighting unit 142 is in a retracted position (see FIG. 4A). In an opened position of the cover unit 100 (see FIGS. 3B and 4B), the first cover element 102 and the second cover element 144 are spaced apart from each other (see FIG. 4B) and the lighting unit 142 is protruding between the first cover element 102 and the second cover element 144.

Figure 5A:
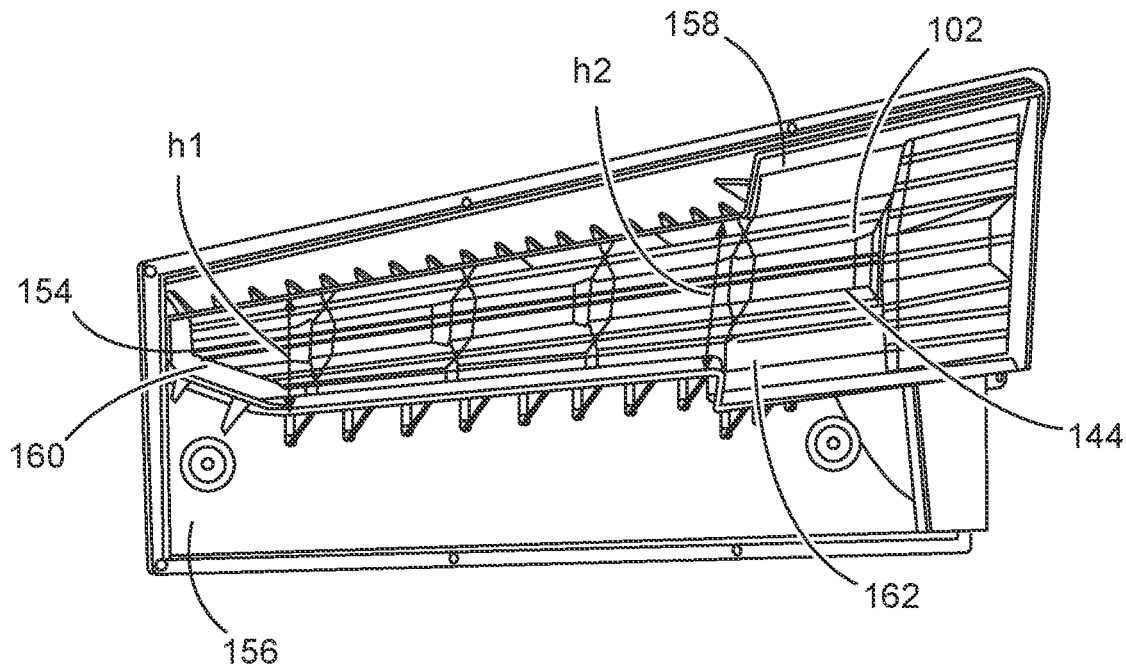
FIG. 5A shows a schematic perspective view of an exemplary embodiment of the lighting mounting in the closed position.
Figure 5B:
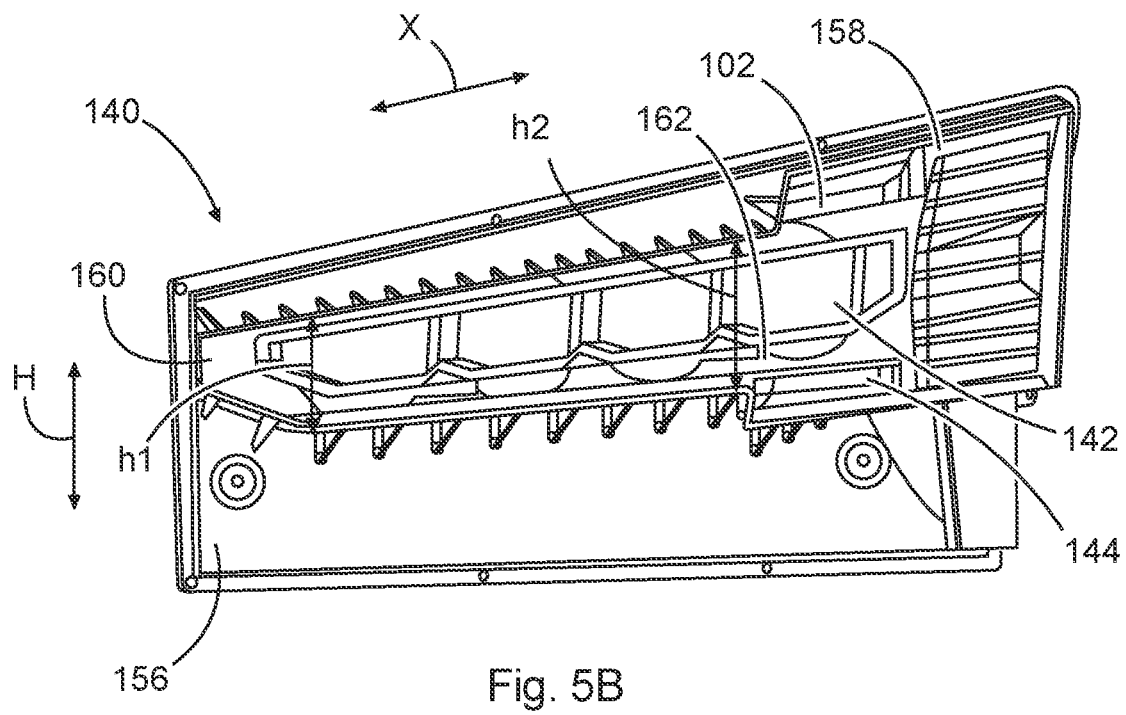
FIG. 5B shows a schematic perspective view of the lighting mounting in the opened position.

As exemplarily shown in FIGS. 5A and 5B, the lighting mounting 140 further includes a mounting body 156 having an opening 158. The mounting body 156 is configured to be attached to a body of the vehicle (not illustrated). The opening 158 is configured to substantially match an opening in the body of the vehicle (not illustrated) and further to expose the lighting unit 142. The cover unit 100 is configured to selectively cover (see FIG. 5A) or un-cover or expose, respectively, (see FIG. 5B) the opening 158. The lighting mounting 140 shown in FIGS. 5A and 5B is an example for a headlamp mounting.

In FIGS. 5A and 5B, it can be seen that the opening 158 has a non-rectangular contour. Exemplarily, the contour of the opening 158 is tapered, which means that a height h1 at a first axial end 160 of the opening 158 is smaller than a height h2 at a second axial end 162 of the opening 158. The cover unit 100 is configured such that the first cover element 102 and the second cover element 144 form a substantially horizontal contact line 154 in the closed position (see FIG. 5A).

Further, the first cover element 102 and the second cover element 144 are moved by the respective driving mechanism 108, 110, 150, 152 such that the respective first axial end 104, 146 of the respective cover element 102, 144 is moved less in a height direction H than the respective second axial end 106, 148 of the respective cover element 102, 144. As an example, the first axial end 104 of the first cover element 102 is moved about half of the distance of height h1 in the height direction H by the first driving mechanism 108, and the second axial end 106 of the first cover element 102 is moved about half of the distance of height h2 in the height direction H by the second driving mechanism 110 to uncover a first half of the opening 158 (in FIG. 5B: an upper half of the opening 158). Further, the first axial end 146 of the second cover element 144 is moved about half of the distance of height h2 in the height direction H by the third driving mechanism 150, and the second axial end 148 of the second cover element 144 is moved about half of the distance of height h2 in the height direction H by the fourth driving mechanism 152 to uncover a second half of the opening 158 (in FIG. 5B: a lower half of the opening 158).

However, it is also possible that the first cover element 102 covers more than half of the opening 158 resulting in the second cover element 144 covering the remaining part of the opening 158, or that the first cover element 102 covers less than half of the opening 158 resulting in the second cover element 144 covering the remaining part of the opening 158. Further, the opening 158 may have other contours and/or shapes, such as a triangular contour, a trapezoidal contour etc.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The invention claimed is:

1. A cover unit for selectively covering an opening in a structure, the cover unit comprising:
   at least a first cover element having a first axial end being coupled to a first driving mechanism, and a second axial end being coupled to a second driving mechanism;
   the first driving mechanism and the second driving mechanism being configured to move the first cover element between a closed position and an opened position;
   each of the first driving mechanism and the second driving mechanism being controlled individually, and comprising:
      an arm being configured to be rotatively coupled to the structure,
      at least one drive unit being configured to drive a movement of the arm, and
      a joint configured to couple the arm to the respective axial end of the first cover element, the joint being configured to allow rotation about two different axes and linear motion along a third axis different from the two different axes,
   wherein the joint is configured to allow the first axial end and the second axial end of the first cover element to be moved differently during an opening movement and/or a closing movement.

2. The cover unit according to claim 1, further comprising:
   a second cover element having a first axial end being coupled to a third driving mechanism, and a second axial end being coupled to a fourth driving mechanism;
   the third driving mechanism and the fourth driving mechanism being configured to move the second cover element between a closed position and an opened position;
   each of the third driving mechanism and the fourth driving mechanism being controlled individually, and comprising:
      an arm being configured to be rotatively coupled to the structure,
      at least one drive unit being configured to drive a movement of the arm, and
      a joint configured to couple the arm to the respective axial end of the second cover element, the joint being configured to allow rotation about two different axes and linear motion along a third axis different from the two different axes,
   wherein the joint is configured to allow the first axial end and the second axial end of the second cover element to be moved differently during an opening movement and/or a closing movement,
   the first driving mechanism, the second driving mechanism, the third driving mechanism and the fourth driving mechanism being configured to be attached to the structure,
   wherein the first cover element and the second cover element are configured to contact each other in the closed position along a contact line to cover the opening, and
   wherein the first cover element and the second cover element are configured to be spaced apart from each other in the opened position to expose the opening.

3. The cover unit according to claim 1, wherein, during the opening movement, the first axial end of the first cover element is moved a shorter distance than the second axial end of the first cover element.

4. The cover unit according to claim 1, wherein, during the opening movement, the first axial end of the second cover element is moved a shorter distance than the second axial end of the second cover element.

5. The cover unit according to claim 1, wherein each of the first driving mechanism and the second driving mechanism is configured to move the first cover element in at least two different spatial directions.

6. The cover unit according to claim 2, wherein each of the third driving mechanism and the fourth driving mechanism is configured to move the second cover element in at least two different spatial directions.

7. A lighting mounting for a vehicle, the lighting mounting comprising:
   a mounting body comprising an opening,
   a lighting unit comprising at least one light source configured to be exposable in the opening of the mounting body, and
   a cover unit configured to cover or expose the opening, the cover unit comprising:
      at least a first cover element having a first axial end being coupled to a first driving mechanism, and a second axial end being coupled to a second driving mechanism;

the first driving mechanism and the second driving mechanism being configured to move the first cover element between a closed position and an opened position;

each of the first driving mechanism and the second driving mechanism being controlled individually, and comprising:

an arm being configured to be rotatively coupled to the structure, at least one drive unit being configured to drive a movement of the arm, and a joint configured to couple the arm to the respective axial end of the first cover element, the joint being configured to allow rotation about two different axes and linear motion along a third axis different from the two different axes, wherein the joint is configured to allow the first axial end and the second axial end of the first cover element to be moved differently during an opening movement and/or a closing movement.

8. The lighting mounting according to claim 7, wherein the opening has a substantially non-rectangular shape.

9. The lighting mounting according to claim 7, wherein the opening is configured to fit to an opening in the body of the vehicle.

10. The lighting mounting according to claim 7, wherein the lighting unit further comprises a driving unit configured to move the lighting unit towards the opening and/or to retract the lighting unit from the opening.

11. The lighting mounting according to claim 10, wherein the driving unit is configured to retract the lighting unit during a closing movement of the cover elements and/or to move the lighting unit towards the opening during an opening movement of the cover elements.

12. The lighting mounting according to claim 7, the lighting unit further comprising several light sources.

* * * * *